United States Patent
Cho et al.

(10) Patent No.: US 8,768,553 B2
(45) Date of Patent: Jul. 1, 2014

(54) METHOD AND SYSTEM FOR CONTROLLING CHARGING OF BATTERY FOR HYBRID ELECTRIC VEHICLE

(71) Applicants: Hyundai Motor Company, Seoul (KR); Kia Motors Corporation, Seoul (KR)

(72) Inventors: Jinkuk Cho, Gyeonggi-Do (KR); Yong Kak Choi, Seoul (KR); Il Kwon Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/723,720

(22) Filed: Dec. 21, 2012

(65) Prior Publication Data

US 2014/0067175 A1 Mar. 6, 2014

(30) Foreign Application Priority Data

Sep. 6, 2012 (KR) .................... 10-2012-0098869

(51) Int. Cl.
*B60L 11/02* (2006.01)
*B60L 11/00* (2006.01)

(52) U.S. Cl.
USPC .................... 701/22; 180/65.21; 180/65.31

(58) Field of Classification Search
USPC ......... 701/22, 70, 93; 180/65.1, 65.21, 65.31; 320/104, 155, DIG. 34; 340/635, 636.1
See application file for complete search history.

(56) References Cited

U.S. PATENT DOCUMENTS

| 5,857,161 A | 1/1999 | Zeilinger et al. |
| 6,509,720 B2 * | 1/2003 | Ikeda ............................ 320/135 |
| 2013/0066495 A1 * | 3/2013 | Furuta ............................ 701/22 |

FOREIGN PATENT DOCUMENTS

| JP | 2010-214991 A | 9/2010 |
| KR | 10-2005-0048278 | 5/2005 |
| KR | 1020120045278 A | 5/2012 |
| KR | 1020120060067 A | 6/2012 |

* cited by examiner

*Primary Examiner* — Mary Cheung
*Assistant Examiner* — Rodney Butler
(74) *Attorney, Agent, or Firm* — Edwards Wildman Palmer LLP; Peter F. Corless

(57) ABSTRACT

The present invention relates to a method and system for controlling charging of a battery supplying power to a hybrid electric vehicle according to a driving state. The method includes: detecting, by a sensor, a speed of the vehicle, generating, by a generator, power according to a driving state of the vehicle; controlling, by a controller, a charge to the battery using generated power of the power generator based on a signal of the vehicle speed detector; calculating, by the controller, an average vehicle speed for a set time; updating, by the controller, the average vehicle speed at an update period shorter than the set time; changing a state of charge (SOC) charging band, a charging reference of the battery, based on the average vehicle speed; and determining, by the controller whether to charge the battery according to a driving state based on the SOC charging band.

17 Claims, 6 Drawing Sheets

METHOD AND SYSTEM FOR CONTROLLING CHARGING OF BATTERY FOR HYBRID ELECTRIC VEHICLE

CROSS-REFERENCE TO RELATED APPLICATION

This application claims priority to and the benefit of Korean Patent Application No. 10-2012-0098869 filed in the Korean Intellectual Property Office on Sep. 6, 2012, the entire contents of which are incorporated herein by reference.

BACKGROUND OF THE INVENTION (a) Field of the Invention

The present invention relates to a method and a system for controlling charging of a battery, which controls charging of a battery supplying power for driving a hybrid electric vehicle according to a driving state and a driving condition.

(b) Description of the Related Art

As is well known, due to increases in oil prices and exhaust gas regulations, eco-friendly policies and fuel efficiency improvement have researched in the development of a vehicle. Accordingly, vehicle manufacturers have developed a technology for reducing fuel and decreasing exhaust gas to meet eco-friendly policies and improve fuel efficiency. Furthermore, a hybrid electric vehicle (HEV) using a motor driven by power of a high-voltage battery as a power resource has been developed.

FIG. 1 illustrates an exemplary configuration of a conventional parallel hybrid electric vehicle.

Referring to FIG. 1, a hybrid electric vehicle may include: a transmission 22 for changing and determining a speed ratio of a driving shaft 12 and a wheel shaft 14; a motor 24 capable of transferring power to the driving shaft 12 by using electric energy and regenerating energy by using inertia of the vehicle; an engine 26 for generating power by using fuel; an engine-side clutch 28 for transferring power of the engine 26 to the driving shaft 12 or blocking the transfer of the power of the engine 26 to the driving shaft 12; and an engine starting/stopping motor 32 for starting and stopping the engine 26.

The hybrid electric vehicle may run by appropriately combining and using power of the engine 26 and/or the power of the motor 24. Furthermore, fuel efficiency of the hybrid electric vehicle may vary according to a start-up time of the engine 26, an operation point of the engine 26, and a strategy for controlling and managing a state of charge (SOC) of a high-voltage battery mounted in the hybrid electric vehicle.

Moreover, an average vehicle speed may be used to predict a driving condition of the hybrid electric vehicle. When the hybrid electric vehicle travels at an average vehicle speed, an update time of the average vehicle speed and a monitoring time of the average vehicle speed is important to predict a road condition and controlling the hybrid electric vehicle according to the prediction. The existing hybrid electric vehicle employs a method of calculating an average vehicle speed at every set reference time interval and updating the average vehicle speed.

For example, when the set reference time is five minutes, a road condition in which the hybrid electric vehicle will be in for future five minutes is determined by using an average vehicle speed for previous (e.g., past) five minutes.

Additionally, as illustrated in FIG. 2, under an assumption that the vehicle (hereinafter, the vehicle is identically used to the hybrid electric vehicle) is currently driven on a highway at a high speed after being driven in a city area for previous five minutes, various control systems of the vehicle using the average vehicle speed may perform corresponding control using a value of the average vehicle speed during the travel in the city area. Accordingly, an SOC control strategy or engine operation control may be incorrectly set in the hybrid electric vehicle, thereby causing deterioration of fuel efficiency.

Further, for example, as illustrated in FIG. 2, since the existing hybrid electric vehicle performs driving control by classifying a vehicle speed mode only into two driving modes of a city driving mode and a highway driving mode, it may not be possible to efficiently perform the SOC control and management or fuel efficiency control according to a change in road traffic condition.

The above information disclosed in this section is only for enhancement of understanding of the background of the invention and therefore it may contain information that does not form the prior art that is already known in this country to a person of ordinary skill in the art.

SUMMARY

The present invention provides a method and a system for controlling charging of a battery of a hybrid electric vehicle having advantages of improving efficiency of a state of charge (SOC) control strategy and improving fuel efficiency of the hybrid electric vehicle by determining a current driving condition including a traffic condition and controlling charging or discharging of the battery of the hybrid electric vehicle.

An exemplary embodiment of the present invention provides a method of controlling charging of a battery to supply power to a hybrid electric vehicle according to a driving state, the method including: calculating an average vehicle speed for a set time, and updating the average vehicle speed at an update period shorter than the set time; changing a SOC charging band serving as a charging reference of the battery based on the average vehicle speed; and charging the battery according to a driving state based on the SOC charging band.

In the exemplary embodiment of the present invention, the changing of the SOC charging band may include changing a high value of the SOC charging band that is a reference value allowing the charging of the battery only when the SOC of the battery is equal to or smaller than the high value.

In the exemplary embodiment of the present invention, a high value of the SOC band, when the average vehicle speed is larger than a predetermined high speed value, may be set to be larger than a high value of the SOC band when the average vehicle speed is lower than the high speed value.

In the exemplary embodiment of the present invention, the method may further include counting the number of times the vehicle stops during the set time, and the changing of the high value of the SOC band may include changing the high value of the SOC band based on the number of times the vehicle stops in addition to the average vehicle speed.

In the exemplary embodiment of the present invention, the method may further include comparing the number of times the vehicle stops with the number of set times, and a high value of the SOC band when the number of times the vehicle stops is smaller than the number of set times may be set to be larger than a high value of the SOC band when the number of times the vehicle stops is larger than the number of set times. Furthermore, the comparison of the number of times the vehicle stops with the number of set times may be performed when the average vehicle speed is not larger than the high speed value.

In the exemplary embodiment of the present invention, the method may further include comparing the average vehicle speed with a congestion speed value smaller than the high speed value, and a high value of the SOC band when the average vehicle speed may be larger than the congestion speed value may be set to be larger than a high value of the SOC band when the average vehicle speed is smaller than the congestion speed value. Furthermore, the comparison of the average vehicle speed with the congestion speed value may be performed when the number of times the vehicle stops is larger than the number of set times.

In the exemplary embodiment of the present invention, the updating of the average vehicle speed may include calculating the average vehicle speed by deducting a vehicle speed corresponding to an initial stage of the update period in the set time from the average speed and adding a vehicle speed corresponding to an end stage of the update period in the set time to the average.

Another exemplary embodiment of the present invention provides a system for controlling charging of a battery for supplying driving power to a hybrid electric vehicle, the system including: a vehicle speed detector (i.e., a sensor) configured to detect a speed of the hybrid electric vehicle; a power generator (i.e., a generator) configured to generate power according to a driving state of the hybrid electric vehicle; and a controller configured to control the charge of the battery by using generated power of the power generator based on a signal of the vehicle speed detector, wherein the controller may be one or more processors or microprocessors operated by a set program, and the set program includes a series of commands for performing a method of controlling charging of a battery of a hybrid electric vehicle.

As described above, according to the exemplary embodiment of the present invention, it may be possible to improve efficiency of an SOC control strategy and fuel efficiency of a hybrid electric vehicle by controlling charging of a battery of a hybrid electric vehicle by determining a current driving condition. Additionally, it may be possible to charge a battery of a hybrid electric vehicle according to a driving condition by setting an update time of an average vehicle speed to reflect a current driving condition, thereby efficiently managing the control of the battery.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the term controller refers to a hardware device that includes a memory and a processor. The memory is configured to store the modules/units and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

Figure 1:
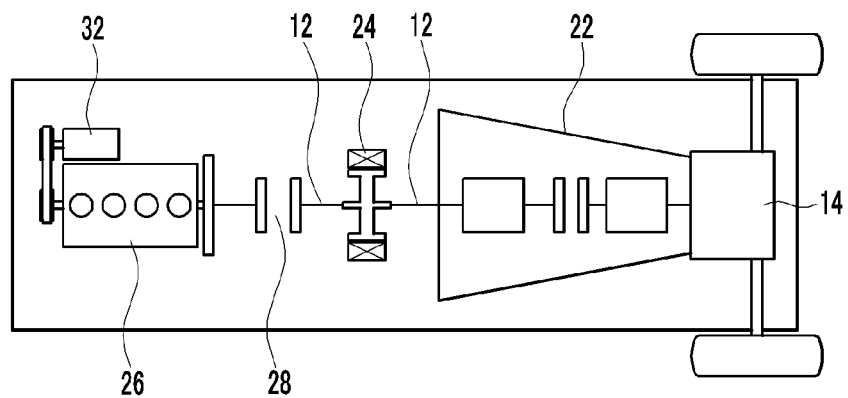
FIG. 1 is an exemplary diagram of a general hybrid electric vehicle, according to the related art.
Figure 2:
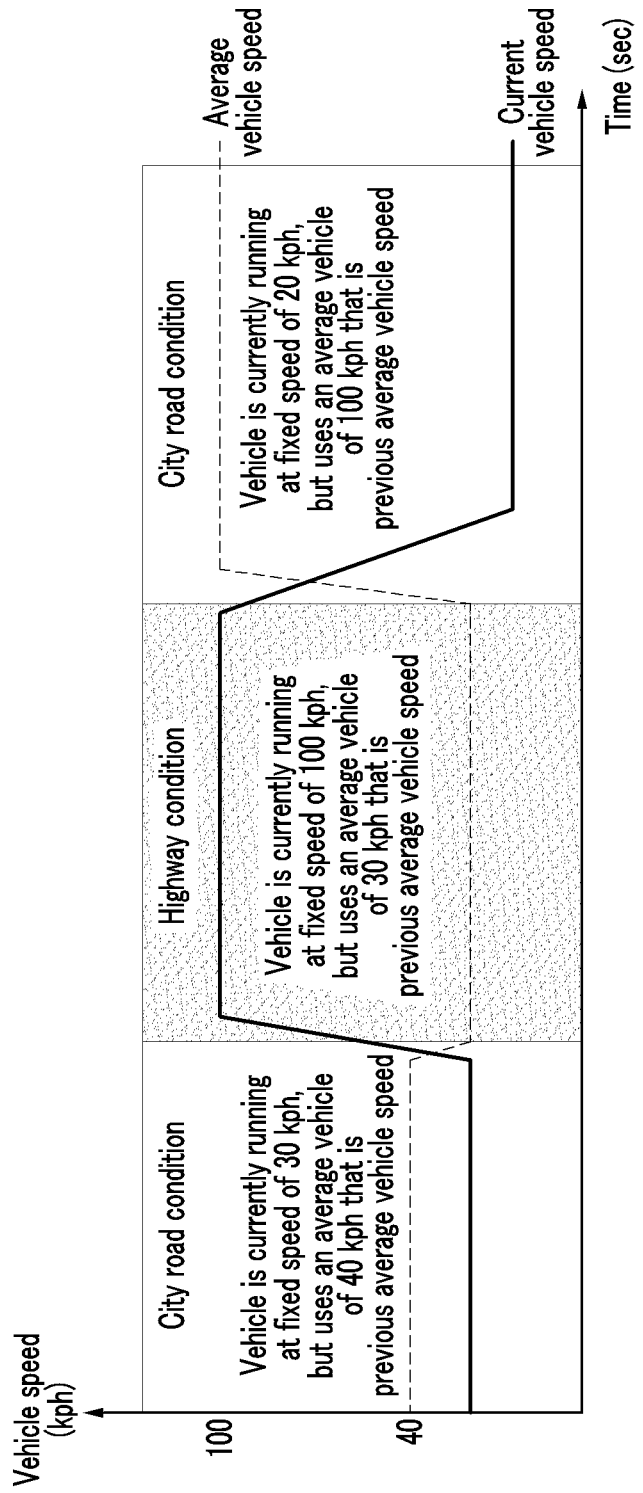
FIG. 2 is an exemplary diagram describing a problem of the related art.

FIG. 1 is an exemplary diagram illustrating a hybrid electric vehicle to which a system for controlling charging of a battery according to an exemplary embodiment of the present invention is applied.

As illustrated in FIG. 1, a hybrid electric vehicle to which a system for controlling charging of a battery according to an exemplary embodiment of the present invention may be applied may include: a transmission 22 configured to change and determine a speed ratio of a driving shaft 12 and a wheel shaft 14; a motor 24 capable of transferring power to the driving shaft 12 by electric energy and regenerating energy using inertia of the vehicle; an engine 26 configured to generate power using fuel; an engine-side clutch 28 configured to transfer power of the engine 26 to the driving shaft 12 or block the transfer of the power of the engine 26 to the driving shaft 12; and an engine starting/stopping motor 32 configured to start and stop the engine 26.

The motor 24 and the engine starting/stopping motor 32 in the hybrid electric vehicle are operated as power generators (i.e., generators) to charge the battery which is publicly known, thus the detailed descriptions thereof will be omitted in the present specification.

Figure 4:
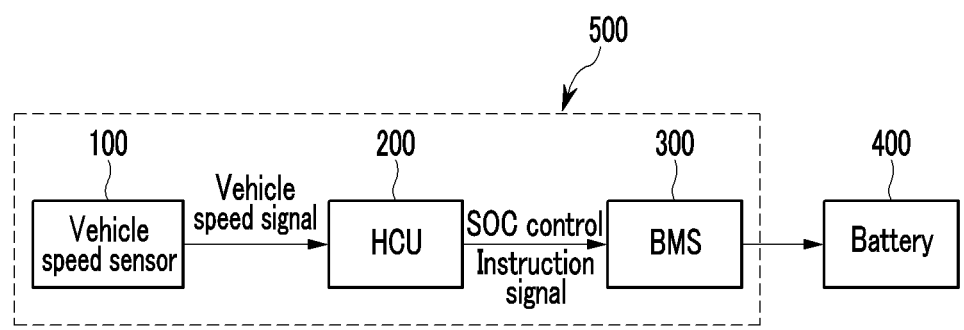
FIG. 4 is an exemplary block diagram of a system for controlling charging of a battery of a hybrid electric vehicle, according to an exemplary embodiment of the present invention.
Figure 5:
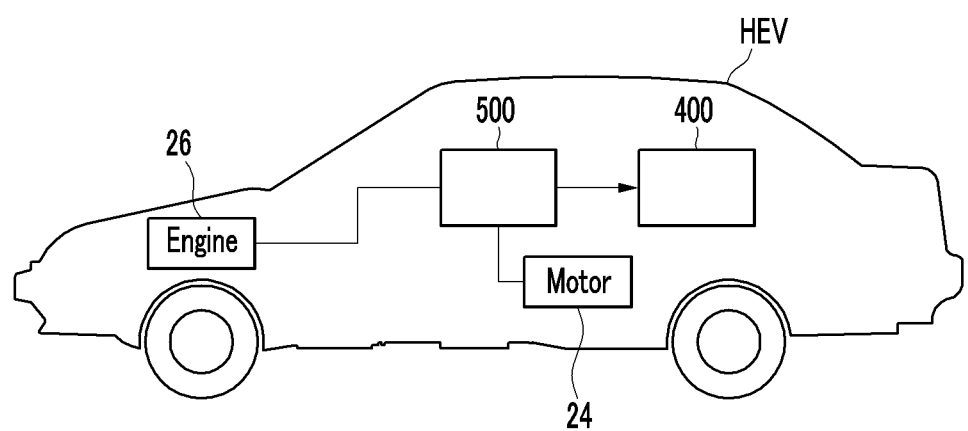
FIG. 5 is an exemplary diagram of a hybrid electric vehicle, according to an exemplary embodiment of the present invention.

FIG. 4 is an exemplary block diagram illustrating a system for controlling charging of a battery of a hybrid electric vehicle, according to an exemplary embodiment of the present invention. FIG. 5 is a hybrid electric vehicle (HEV) in which a driving control system according to an exemplary embodiment of the present invention is installed, and may include the engine 26, the motor 24, a battery 400, and a charging control system 500.

The system for controlling charging of the battery of the hybrid electric vehicle according to the exemplary embodiment of the present invention is a battery charging control system for controlling charging of a battery supplying driving power to the hybrid electric vehicle.

As illustrated in FIGS. 1 and 4, the system for controlling charging of the battery of the hybrid electric vehicle may include a vehicle speed sensor 100 (i.e., a sensor) configured to detect a speed of the hybrid electric vehicle as a vehicle speed detector, the motor 24 and the engine starting/stopping motor 32 configured to operate as generators according to a driving state of the hybrid electric vehicle; and controllers 200 and 300 configured to control the charge of the battery 400 by generated voltage of the generators 24 and 32 based on a signal of the vehicle speed sensor 100.

The vehicle speed detector may be a vehicle speed sensor attached to the wheel to detect a rotation speed, or may be a vehicle speed sensor attached to a final reduction gear of the transmission, but it should be understood that the scope of the present invention is not limited thereto. The technical spirit of the present invention may be applied to a configuration which may calculate a value corresponding to an actual vehicle speed.

The controller may be one or more processors or microprocessors operated by a set program, and the set program may include a series of commands for performing a method of controlling charging of a battery according to an exemplary embodiment of the present invention.

In the exemplary embodiment of the present invention, the controller may include a battery management system (BMS) 300 for managing the battery for supplying driving power to the hybrid electric vehicle and a hybrid controller (HCU) 200 for controlling a general operation of the hybrid electric vehicle. In a method of controlling charging of a battery according to an exemplary embodiment of the present invention to be described below, some partial processes thereof may be performed by the BMS 300, and other partial processes thereof may be performed by the HCU 200. However, it should be understood that the scope of the present invention is not limited to the exemplary embodiment to be described below. The controller may be implemented with a different combination from that described in the exemplary embodiment of the present invention. The BMS 300 and the HCU 200 may perform a different combination of processes from that described in the exemplary embodiment.

In the exemplary embodiment of the present invention, the BMS 300 may be a system for managing the battery 400 configured to supply driving power to the hybrid electric vehicle. A mechanical configuration of the BMS 300 is apparent to those skilled in the art, thus a more detailed description thereof will be omitted. Further, the HCU 200 may be a controller for controlling a general operation of the hybrid electric vehicle, and a mechanical configuration of the HCU 200 is apparent to those skilled in the art, thus a more detailed description thereof will be omitted.

Hereinafter, a method of controlling charging of a battery of a hybrid electric vehicle according to an exemplary embodiment of the present invention will be described in detail with reference to the accompanying drawings.

Figure 3:
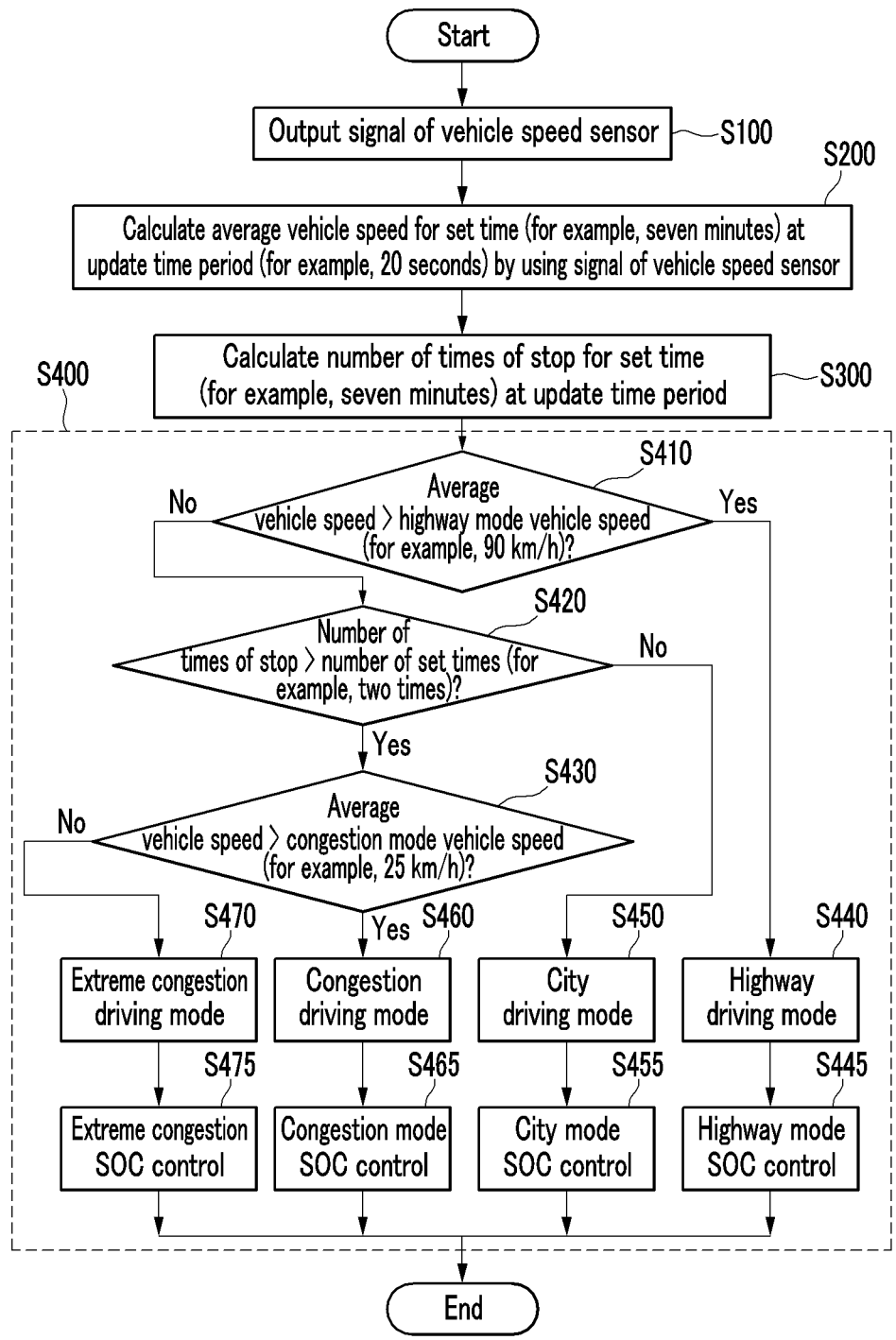
FIG. 3 is an exemplary flowchart of a method of controlling charging of a battery of a hybrid electric vehicle, according to an exemplary embodiment of the present invention.

FIG. 3 is a flowchart illustrating a method of controlling charging of a battery of a hybrid electric vehicle according to an exemplary embodiment of the present invention. As illustrated in FIG. 3, the HCU 200 may receive a signal output of the vehicle speed sensor 100 and calculate a current vehicle speed of the hybrid electric vehicle (S100). The HCU 200 may calculate an average vehicle speed for a set time based on the calculated current vehicle speed, and update the average vehicle speed at an update period shorter than the set time (S200) wherein the update period is a period of time that the controller updates the average vehicle speed.

In the exemplary embodiment of the present invention, the setting time for calculating the average vehicle speed and the update period for updating the average vehicle speed may be different. Specifically, the update period may be set to be shorter than the set time. In other words, the set time may be set to be a substantially longer time (e.g., five minutes or seven minutes) so the average speed is not excessively fluctuated and may maintain a mean time as an average for indicating a driving situation. However, the update period may be set to a substantially shorter time (e.g., 10 seconds or 20 seconds) to determine whether to charge the battery in real time.

Moreover, when the HCU 200 updates the average vehicle speed, the HCU 200 may calculate an updated average vehicle speed by deducting a vehicle speed corresponding to an initial stage of the update period in the set time from the average speed and adding a vehicle speed corresponding to an end stage of the update period in the set time to the average speed. For example, when the vehicle speed is measured by the unit of 10 seconds and the measured vehicle speed is averaged for five minutes, the number of vehicle speed data points used for the average is 300 which when multiplied by the 10 seconds equals 3,000. Further, when the average vehicle speed is updated for every 10 seconds, it may not be necessary to perform a calculation of adding 3,000 vehicle speed data points every time and dividing the added vehicle speed data points by the average speed, thereby achieving a simple calculation. [NOTE: Please confirm that the added vehicle speed data points is divided by the average speed.]

After calculating the average vehicle speed as described above, the HCU 200 counts the number of times the vehicle stops for the set time (S300). In step S300 of counting the number of times of stop, the HCU 200 counts the number of times of stop for the same set time and updates the same update period as that of the step of calculating the average vehicle speed.

A stop condition for counting the number of times the vehicle stops may be variously set. When a vehicle speed of 1 km/h or lower a stop may be determined in the exemplary embodiment of the present invention. However, the scope of the present invention is not limited thereto.

When the average vehicle speed and the number of times the vehicle stops are calculated, the HCU 200 may compare the average vehicle speed with a highway mode vehicle speed (e.g., 90 km/h) which may be a set high vehicle speed (S410). When the average vehicle speed exceeds the highway mode vehicle speed as a result of the comparison between the average vehicle speed and the highway mode vehicle speed, the HCU 200 may control the battery 400 to be in a highway mode SOC by controlling the BMS 300 (S440 and S445).

Figure 6:
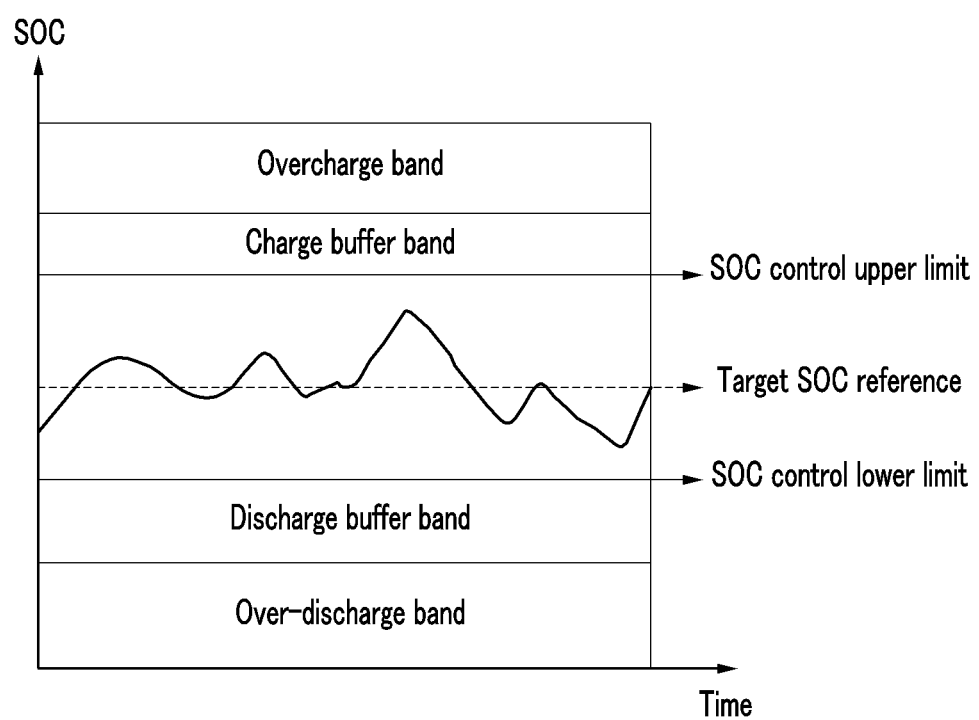
FIG. 6 is an exemplary diagram for describing an operation, according to an exemplary embodiment of the present invention.

Further, in the highway mode the engine may have charging power to charge the battery 400 up to a charging buffer band beyond an SOC control upper limit by the power of the engine as illustrated in FIG. 6. Accordingly, in the highway mode SOC control, the HCU 200 may charge the battery 400 while controlling the BMS 300 to increase the SOC control upper limit to an allowable maximum range (e.g., a first upper limit range).

In step S410, when the average vehicle speed is equal to or lower than the highway mode vehicle speed as the result of the comparison between the average vehicle speed and the highway mode vehicle speed, the HCU 200 may determine whether the number of times the vehicle stops exceeds the number of set times (e.g., two times) (S420). In step S420, when the number of times the vehicle stops does not exceed the number of set times, the HCU 200 may control the battery 400 to be in a city mode SOC by controlling the BMS 300 (S450 and S455). Further, in the city mode the engine may have charging power to charge the battery 400 between the SOC control upper limit and an SOC control lower limit as illustrated in FIG. 6. Accordingly, in the city mode SOC control, the HCU 200 may charge the battery while controlling the BMS 300 to increase the SOC control upper limit up to a range (e.g., a second upper limit range) lower than the first upper limit range.

In step S420, when the number of times the vehicle stops exceeds the number of set times, the HCU 200 may compare the average vehicle speed with a congestion mode vehicle speed (e.g., 25 km/h) (S430). In step S430, when the average vehicle speed exceeds the congestion mode vehicle speed as a result of the comparison between the average vehicle speed and the congestion mode vehicle speed, the HCU 200 may control the battery 400 to be in a congestion mode SOC through the BMS 300 (S460 and S465). Since the hybrid electric vehicle in the congestion mode may frequently run only with the power of the motor, the battery 400 may be much discharged. Accordingly, in the congestion mode SOC control, the HCU 200 may control the SOC by decreasing the SOC control lower limit to a discharge buffer band from an allowable maximum range (e.g., a first lower limit range) by controlling the BMS 300.

Otherwise, in the congestion mode SOC control, the HCU 200 may charge the battery 400 while controlling the BMS 300 to increase the SOC control upper limit up to a range (e.g., a third upper limit range) lower than the second upper limit range.

In step S430, when the average vehicle speed does not exceed the congestion mode vehicle speed as the result of the comparison between the average vehicle speed and the congestion mode vehicle speed, the HCU 200 may control the battery 400 to be in an extreme congestion mode SOC through the BMS 300 (S470 and S475). Since the hybrid electric vehicle in the extreme congestion mode frequently runs only with the power of the motor similar to the congestion mode, the battery 400 may be much discharged. Accordingly, the HCU 200 in the extreme congestion mode SOC may control the SOC by decreasing the SOC control lower limit to a discharge buffer band from an allowable range (e.g., a second lower limit range) by controlling the BMS 300. The second lower limit range may be a value lower than the first lower limit range.

Otherwise, in the extreme congestion mode SOC control, the HCU 200 may charge the battery 400 while controlling the BMS 300 to increase the SOC control upper limit up to a range (e.g., a fourth upper limit range) lower than the third upper limit range by controlling the BMS 300.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling charging of a battery for supplying power to a vehicle according to a driving state, the method comprising:
   detecting, by a sensor, a speed of the vehicle;
   generating, by a generator, power according to a driving state of the vehicle;
   controlling, by a controller, a charge to the battery using generated power of the power generator based on a signal of the vehicle speed detector
   calculating, by the controller, an average vehicle speed for a set time;
   updating, by the controller, the average vehicle speed at an update period shorter than the set time;
   changing, by the controller, a state of charge charging band, wherein the state of charge charging band is a charging reference of the battery based on the average vehicle speed; and
   charging, by the controller, the battery according to the driving state based on the state of charge charging band, wherein the updating of the average vehicle speed comprises:
   calculating, by the controller, an updated average vehicle speed by deducting a vehicle speed corresponding to an initial stage of the update period in the set time from the average vehicle speed and adding a vehicle speed corresponding to an end stage of the update period in the set time to the average vehicle speed.

2. The method of claim 1, wherein the changing the state of charge charging band further comprises: changing, by the controller, a high value of the state of charge charging band to charge the battery when the state of charge of the battery is equal to or lower than the high value.

3. The method of claim 2, wherein the high value of the state of charge charging band, when the average vehicle speed is larger than a predetermined high speed value, is set to be larger than a high value of the state of charge charging band when the average vehicle speed is lower than the high speed value.

4. The method of claim 2, further comprising:
   counting, by the controller, a number of times the vehicle stops for the set time, wherein the changing of the high value of the state of charge charging band includes changing the high value of the state of charge charging band based on the number of times the vehicle stops in addition to the average vehicle speed.

5. The method of claim 4, further comprising:
   comparing, by the controller, the number of times the vehicle stops with the number of set times, wherein a high value of the state of charge charging band, when the number of times the vehicle stops is smaller than the number of set times, is set to be larger than a high value of the state of charge charging band when the number of times the vehicle stops is larger than the number of set times.

6. The method of claim 4, wherein comparing of the number of times the vehicle stops with the number of set times is performed when the average vehicle speed is smaller than the high speed value.

7. The method of claim 3, further comprising:
   comparing, by the controller, the average vehicle speed with a congestion speed value smaller than the high speed value, wherein a high value of the state of charge charging band when the average vehicle speed is larger than the congestion speed value is set to be larger than a high value of the state of charge charging band when the average vehicle speed is smaller than the congestion speed value.

8. The method of claim 6, further comprising:
   comparing, by the controller, the average vehicle speed with a congestion speed value smaller than the high speed value, wherein a high value of the state of charge charging band when the average vehicle speed is larger than the congestion speed value is set to be larger than a high value of the state of charge charging band when the average vehicle speed is smaller than the congestion speed value.

9. The method of claim 8, wherein comparing of the average vehicle speed with the congestion speed value is performed when the number of times the vehicle stops is larger than the number of set times.

10. A system for controlling charging of a battery for supplying driving power to a vehicle, the system comprising:
a vehicle speed detector including a speed sensor, wherein the vehicle speed detector is configured to detect a speed of the vehicle;
a power generator configured to generate power according to a driving state of the vehicle; and
a controller configured to:
control a charge to the battery using generated power of the power generator based on a signal of the vehicle speed detector;
calculate an average vehicle speed for a set time;
update the average vehicle speed at an update period shorter than the set time;
change a state of charge charging band, wherein the state of charge charging band is a charging reference of the battery based on the average vehicle speed;
charge the battery according to a driving state based on the state of charge charging band; and
calculate an updated average vehicle speed deducting a vehicle speed corresponding to an initial stage of the update period in the set the from the average vehicle speed and adding a vehicle speed corresponding to an end stage of the update period in the set time to the average vehicle speed.

11. The system of claim 10, wherein the controller is further configured to:
change a high value of the state of charge charging band to charge the battery when the state of charge of the battery is equal to or lower than the high value, wherein the high value of the state of charge charging band, when the average vehicle speed is larger than a predetermined high speed value, is set to be larger than a high value of the state of charge charging band when the average vehicle speed is lower than the high speed value.

12. The system of claim 11, wherein the controller is further configured to:
count a number of times the vehicle stops for the set time, wherein the changing of the high value of the state of charge charging band includes changing the high value of the state of charge charging band based on the number of times the vehicle stops in addition to the average vehicle speed;
compare the number of times the vehicle stops with the number of set times, wherein a high value of the state of charge charging band, when the number of times the vehicle stops is smaller than the number of set times, is set to be larger than a high value of the state of charge charging band when the number of times the vehicle stops is larger than the number of set times;
compare the average vehicle speed with a congestion speed value smaller than the high speed value, wherein a high value of the state of charge charging band when the average vehicle speed is larger than the congestion speed value is set to be larger than a high value of the state of charge charging band when the average vehicle speed is smaller than the congestion speed value; and
compare the average vehicle speed with a congestion speed value smaller than the high speed value, wherein a high value of the state of charge charging band when the average vehicle speed is larger than the congestion speed value is set to be larger than a high value of the state of charge charging band when the average vehicle speed is smaller than the congestion speed value.

13. The system of claim 12, wherein the controller is configured to:
compare the number of times the vehicle stops with the number of set times when the average vehicle speed is smaller than the high speed value; and
compare the average vehicle speed with the congestion speed value when the number of times the vehicle stops is larger than the number of set times.

14. A non-transitory computer readable medium containing program instructions executed by a processor or controller, the computer readable medium comprising:
program instructions that control a vehicle speed detector to detect a speed of the vehicle;
program instructions that control a power generator to generate power according to a driving state of the vehicle;
program instructions that control a charge to the battery using generated power of the power generator based on a signal of the vehicle speed detector;
program instructions that calculate an average vehicle speed for a set time;
program instructions that update the average vehicle speed at an update period shorter than the set time;
program instructions that change a state of charge charging band, wherein the state of charge charging band is a charging reference of the battery based on the average vehicle speed;
program instructions that charge the battery according to a driving state based on the state of charge charging band; and
program instructions that calculate an updated average vehicle speed by deducting a vehicle speed corresponding to an initial stage of the update period in the set time from the average vehicle speed and adding a vehicle speed corresponding to an end stage of the update period in the set time to the average vehicle speed.

15. The computer readable medium of claim 14, further comprising:
program instructions that change a high value of the state of charge charging band to charge the battery when the state of charge of the battery is equal to or lower than the high value, wherein the high value of the state of charge charging band, when the average vehicle speed is larger than a predetermined high speed value, is set to be larger than a high value of the state of charge charging band when the average vehicle speed is lower than the high speed value.

16. The computer readable medium of claim 15, further comprising:
program instructions that count a number of times the vehicle stops for the set time, wherein the changing of the high value of the state of charge charging band includes changing the high value of the state of charge charging band based on the number of times the vehicle stops in addition to the average vehicle speed;
program instructions that compare the number of times the vehicle stops with the number of set times, wherein a high value of the state of charge charging band, when the number of times the vehicle stops is smaller than the number of set times, is set to be larger than a high value of the state of charge charging band when the number of times the vehicle stops is larger than the number of set times;

program instructions that compare the average vehicle speed with a congestion speed value smaller than the high speed value, wherein a high value of the state of charge charging band when the average vehicle speed is larger than the congestion speed value is set to be larger than a high value of the state of charge charging band when the average vehicle speed is smaller than the congestion speed value; and program instructions that compare the average vehicle speed with a congestion speed value smaller than the high speed value, wherein a high value of the state of charge charging band when the average vehicle speed is larger than the congestion speed value is set to be larger than a high value of the state of charge charging band when the average vehicle speed is smaller than the congestion speed value.

17. The computer readable medium of claim 16, further comprising:

program instructions that compare the number of times the vehicle stops with the number of set times when the average vehicle speed is smaller than the high speed value; and program instructions that compare the average vehicle speed with the congestion speed value when the number of times the vehicle stops is larger than the number of set times.

* * * * *